United States Patent [19]

Veith

[11] 3,707,766

[45] Jan. 2, 1973

[54] METHOD OF MANUFACTURING A PLURALITY OF BRIDGE RECTIFIERS

[75] Inventor: Alois L. Veith, Freiburg, Germany

[73] Assignee: ITT Industries, Inc., New York, N.Y.

[22] Filed: May 6, 1971

[21] Appl. No.: 140,770

[30] Foreign Application Priority Data

May 13, 1970 Germany....................P 20 23 288.6

[52] U.S. Cl. ....................29/588, 29/589, 174/52 PE

[51] Int. Cl. ............................................B01j 17/00

[58] Field of Search..........29/588, 589, 576 S, 576 J; 317/234 W; 174/52 PE, 3 FP

[56] References Cited

UNITED STATES PATENTS 3,076,253 2/1963 Cornelison et al. ................29/576 S 3,356,914 12/1967 Whigham et al.................317/234 W 3,391,456 7/1968 Gannoe..............................29/576 S 3,494,022 2/1970 Maute...............................174/52 PE

*Primary Examiner*—Charles W. Lanham

*Assistant Examiner*—W. Tupman

*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A plurality of rectifier bridges are made simultaneously by placing rectifier components on both sides at the end of comb leads. A T-shaped part is placed in contact with each pair of rectifiers on each side of the comb leads to complete the bridge. Each bridge is encapsulated and the comb leads are severed from the comb support.

11 Claims, 5 Drawing Figures

Fig. 1
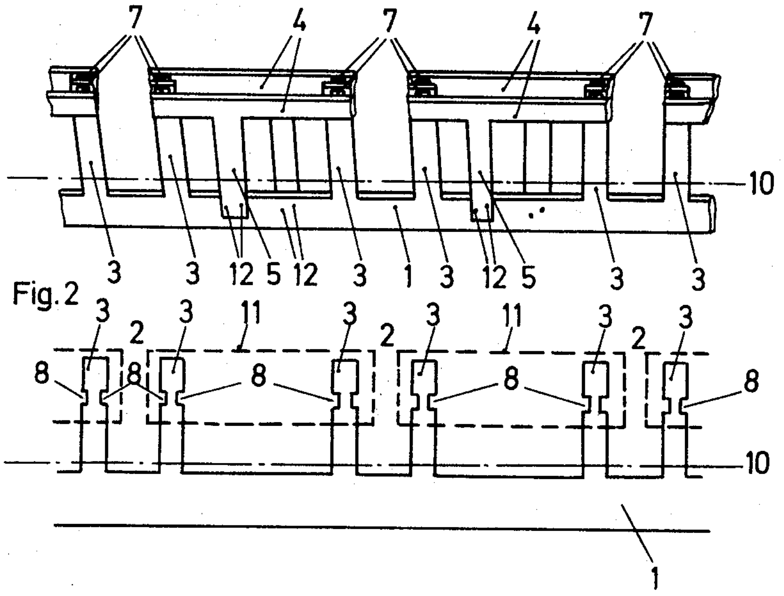
Fig. 1, Fig. 2
Fig.3
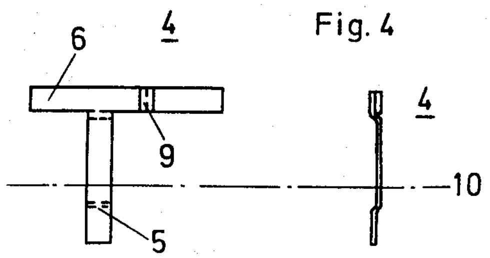
Fig. 3, Fig. 4
Fig. 5
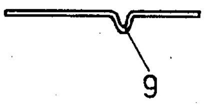
INVENTOR
ALOIS L. VEITH
BY Stephen A. Young
ATTORNEY

METHOD OF MANUFACTURING A PLURALITY OF BRIDGE RECTIFIERS

BACKGROUND OF THE INVENTION

The present invention relates to the manufacture of bridge rectifiers. There has already become known a great number of constructions of bridge rectifiers and methods of manufacturing same. Relative thereto, there have recently become known, for example, the German published patent applications (DOS) 14 39 085, 15 14 525, 19 12 756 and the German petty patent (utility model) 6,917,332, all relating to constructions and manufacturing methods requiring more or less complicated individual parts and manufacturing processes.

From the German published patent application (DOS) 1,926,902 there has become known a method of producing a plurality of bridge rectifiers, whose construction is suitable for manufacturing the rectifiers on supporting ribbons. The type of construction of this bridge rectifier, however, has the disadvantage of being incapable of being plugged with one side to a chassis or socket, because the contacts extend in pairs in opposite directions. Moreover, the known bridge rectifier comprises contacting metal parts of different kinds of shapes which are relatively complicated.

SUMMARY OF THE INVENTION

It is the object of the invention to provide an improved and cost-saving method of manufacturing bridge rectifiers capable of being plugged on one side, by using metallic individual parts of as simple as possible shapes.

Moreover, there shall be used as few as possible types of shapes of the contacting metal parts.

According to a broad aspect of this invention, there is provided a method of manufacturing a bridge rectifier having four rectifying elements arranged between four lead-in wires comprising the steps of attaching one end of the longitudinal portion of each of a pair of T-shaped metal parts to the support section of a metal ribbon, said ribbon having at least one pair of metal rungs extending from the support section of said ribbon, each of said T-shaped parts having a metal cross beam connected to the other end of the longitudinal portion, the end of each rung extending between each of the ends of the cross beams of said pair of T-shaped metal parts; placing each element between a corresponding rung and cross beam; electrically connecting each of two electrodes of said each element to said corresponding rung and cross beam, respectively, in accordance with the polarization scheme of said bridge rectifier; encapsulating said bridge rectifier; and severing said rungs and longitudinal portions from the support section of said ribbon.

For manufacturing the bridge rectifier there may be used a ribbon having the shape of a comb with rungs extending on one side of a supporting portion, as well as a ribbon with rungs extending on both sides of a supporting portion, in a double-comb form. Furthermore, it is possible to use a ribbon having the shape of a ladder comprising two supporting portions.

BRIEF DESCRIPTION OF THE DRAWINGS

FIG. 1 shows the stage of manufacturing the bridge rectifiers prior to the separation from the supporting portion of the ribbon, and prior to being inserted into plastic material or into a casing;

FIG. 2 shows the ribbon with the rungs attached on one side to a supporting portion; and FIGS. 3 to 5 show one type of T-shaped metal part in a front, side, and top view.

DESCRIPTION OF THE PREFERRED EMBODIMENT

For manufacturing the plurality of bridge rectifiers on a ribbon according to FIG. 2, T-shaped metal parts 4, shown in FIGS. 1 and 3 to 5, are attached, for example, by way of spot welding on either side of the supporting portion 1 of the ribbon according to FIG. 1, in such a way that the semiconductor elements can be clamped and contacted between the ends of the rungs 3 and the T-shaped metal parts 4. The semiconductor elements 7 are preferably flat monocrystalline semiconductor bodies each having a pn-junction extending parallel in relation to the two surface sides. These rectifying elements 7, for effecting the contacting, are preferably joined to the rungs and T-shaped metal parts by way of soldering using one of the known solders. Soldering of the rectifying elements is most favorably carried out by dipping into a bath kept at soldering temperature.

For facilitating the soldering and the contact-making of the finished bridge rectifiers when plugged into a socket or into a chassis, the rungs 3 and the T-shaped metal parts 4, are already gilt, silver-coated or tinned prior to the soldering. Clamping of the rectifying elements is effected, of course, in accordance with a polarity scheme of the bridge rectifier to be manufactured.

The dot-and-dash line 10 in FIGS. 1 to 4 indicates the line where the bridge rectifiers, after soldering and the subsequently following etching of the rectifying elements for the purpose of improving the reverse breakdown characteristics, are separated from the supporting portion 1 of the ribbon. Preferably, however, the individual bridge rectifiers are still embedded in a plastics material in the known way prior thereto. The dashline 11 in FIG. 2 shows the outline of the plastics envelope. Since the T-shaped parts 4, owing to their shape, are already firmly retained in the plastics material, the rungs 3 require a special shape or design for being anchored in the plastics envelope. To this end, the rungs 3 according to FIG. 2 are provided with cut-out portions 8. For serving the same purpose, there may also be provided projecting, throughgoing, or widened portions on the rungs.

FIGS. 3 to 5 show one type of embodiment of a T-shaped metal part 4 which has proved to be particularly favorable. As is illustrated by the sideview in FIG. 4, the T-shaped metal part is twice bent off so that the surface of the T-shaped part contacts the surface of the semiconductor elements 7 in a flat plane, and without any stress from bending moments. Moreover, the preferred type of embodiment of a T-shaped metal part 4 still comprises a compensating loop 9 intended to compensate for tensions in the direction of the cross beams 6 between pairs of adjacent rectifying elements 7.

It is advisable to manufacture both the ribbon and the T-shaped metal parts 4 by way of punching. The T-shaped metal parts 4 may be attached to the supporting portion 1 of the ribbon automatically by way of spot welding, as is indicated by the welding points 12 in FIG. 1. The described method according to the invention offers the particular advantage that metal parts of only two different shapes can be used; namely the ribbon with the rungs 3 and T-shaped parts 4 of identical shape which are attached to the two flat sides of the supporting portion 1 of the ribbon. Accordingly, there are only required two different punching tools.

It is to be understood that the foregoing description of specific examples of this invention is made by way of example only and is not to be considered as a limitation on its scope.

I claim:

1. A method of manufacturing a bridge rectifier having four rectifying elements arranged between four lead-in wires, comprising the steps of:

attaching one end of the longitudinal portion of each of a pair of T-shaped metal parts to the support section of a metal ribbon, said ribbon having at least one pair of metal rungs extending from the support section of said ribbon, each of said T-shaped parts having a metal cross beam connected to the other end of the longitudinal portion, the end of each rung extending between each of the ends of the cross beams of said pair of T-shaped metal parts;

placing each element between a corresponding rung and cross beam;

electrically connecting each of two electrodes of said each element to said corresponding rung and cross beam, respectively, in accordance with the polarization scheme of said bridge rectifier;

encapsulating said bridge rectifier; and severing said rungs and longitudinal portions from the support section of said ribbon.

2. A method according to claim 1 wherein said T-shaped metalparts are attached to said support section between each pair of rungs, said rungs extending from one side of said support section in a comb-like fashion.

3. A method according to claim 1 wherein each of said two T-shaped metal parts are respectively attached to opposite sides of said support section of said ribbon.

4. A method according to claim 1 wherein the longitudinal portion of said T-shaped metal parts are bent so as to lie in the same plane as said rungs along the line where said rungs and longitudinal portions are severed from said support section.

5. A method according to claim 1 wherein each of said T-shaped metal parts are provided with a compensating loop.

6. A method according to claim 1 wherein said rectifying elements are electrically connected by way of soldering.

7. A method according to claim 1 wherein said rectifying elements are electrically connected by way of dip soldering in a bath kept at soldering temperature.

8. A method according to claim 1 wherein said bridge rectifiers are encapsulated by being embedded in a plastics material.

9. A method according to claim 8 wherein said rungs are provided with irregular shaped portions so as to be anchored in the embedding material.

10. A method according to claim 1 wherein said ribbon and said T-shaped metal parts are formed by punching from metal stock.

11. A method according to claim 1 wherein said T-shaped metal parts are welded to said support section.

* * * * *